United States Patent
Zhang

(10) Patent No.: US 10,567,181 B2
(45) Date of Patent: Feb. 18, 2020

(54) BIT INDEX EXPLICIT REPLICATION (BIER) PENULTIMATE HOP POPPING

(71) Applicant: Juniper Networks, Inc., Sunnyvale, CA (US)

(72) Inventor: Zhaohui Zhang, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/024,360

(22) Filed: Jun. 29, 2018

(65) Prior Publication Data

US 2019/0394055 A1    Dec. 26, 2019

Related U.S. Application Data

(63) Continuation-in-part of application No. 16/013,676, filed on Jun. 20, 2018.

(51) Int. Cl.
*H04L 12/28* (2006.01)
*H04L 12/18* (2006.01)
*H04L 12/931* (2013.01)
*H04L 12/723* (2013.01)
*H04L 29/06* (2006.01)

(52) U.S. Cl.
CPC .............. *H04L 12/18* (2013.01); *H04L 45/50* (2013.01); *H04L 49/201* (2013.01); *H04L 69/22* (2013.01)

(58) Field of Classification Search
CPC . H04L 12/18; H04L 12/1836; H04L 12/1877; H04L 12/1881
USPC ......................................... 370/390, 432, 437
See application file for complete search history.

(56) References Cited

U.S. PATENT DOCUMENTS

| | | | | |
|---|---|---|---|---|
| 9,438,432 B2* | 9/2016 | Shepherd | ................ | H04L 45/74 |
| 9,544,230 B2* | 1/2017 | Wijnands | ................ | H04L 45/28 |
| 9,906,378 B2* | 2/2018 | Lindem, III | ........ | H04L 12/4633 |
| 9,948,574 B2* | 4/2018 | Shepherd | ................ | H04L 45/74 |
| 10,164,794 B2* | 12/2018 | Wijnands | ............ | H04L 12/4625 |
| 2015/0131658 A1* | 5/2015 | Wijnands | ................ | H04L 45/16 370/390 |
| 2017/0317841 A1* | 11/2017 | Xu | ........................ | H04L 12/18 |
| 2018/0205636 A1* | 7/2018 | Hu | ........................ | H04L 45/16 |

(Continued)

OTHER PUBLICATIONS

Wijnands, Encapsulation for BIER in MPLS Networks, IETF, Jun. 2015, pp. 1-15.*

(Continued)

*Primary Examiner* — Dmitry Levitan
(74) *Attorney, Agent, or Firm* — Harrity & Harrity, LLP

(57) ABSTRACT

A network device may receive, from a first neighbor network device, information indicating that the network device is to remove a bit indexed explicit replication (BIER) header from a multicast packet prior to transmitting the multicast packet to the first neighbor network device. The network device may receive the multicast packet from a second neighbor network device, where the multicast packet includes the BIER header and is to be transmitted to the first neighbor network device, and where the network device, the first neighbor network device, and the second neighbor network device are included in a same BIER domain. The network device may remove the BIER header from the multicast packet, and may transmit the multicast packet to the first neighbor network device after removing the BIER header from the multicast packet.

20 Claims, 8 Drawing Sheets

(56) References Cited

U.S. PATENT DOCUMENTS

2018/0278522 A1* 9/2018 Asati .................. H04L 67/2842
2018/0367456 A1* 12/2018 Wijnands .............. H04L 45/745
2019/0075041 A1* 3/2019 Wang .................. H04L 41/0806
2019/0097944 A1* 3/2019 Kotalwar .............. H04L 12/185

OTHER PUBLICATIONS

Przygienda, BEIR support via ISIS, IETF, Jan. 2015, pp. 1-13.*
Psenak, OSPF Extension for BIER, IETF, Feb. 2015, pp. 1-8.*
Wijnands, Multicast using BIER, IETF, Mar. 2015, pp. 1-30.*
Extended European Search Report for Application No. EP19166262. 6, dated Sep. 18, 2019, 11 pages.
Ginsberg L., et al., "Bit Index Explicit Replication (BIER) Support via IS-IS, rfc8401. txt", Internet Engineering Task Force, IETF, Standard Internet Society (ISOC) 4, Switzerland, Jun. 7, 2018, pp. 1-12, XP015126342, [Retrieved on Jun. 7, 2018].
Xie J., et al., "Multicast VPN Using MPLS P2MP and BIER, draft-xie-bier-mvpn-mpls-p2mp-01", Mar. 5, 2018, Switzerland, pp. 1-24, XP05562002, [Retrieved on Sep. 9, 2019] Retrieved from the Internet: [URL: https://tools.ietf.org/pdf/draft-xie-bier-mvpn-mpls-p2mp-01.pdf].
Zhang Z., "BIER Penultimate Hop Popping, draft-zzhang-bier-php-00.txt", Internet Draft BIER, Internet Engineering Task Force, IETF, Internet Society (ISOC) 4, Jul. 2, 2018, pp. 1-7, XP015127588, [Retrieved on Jul. 2, 2018].

* cited by examiner

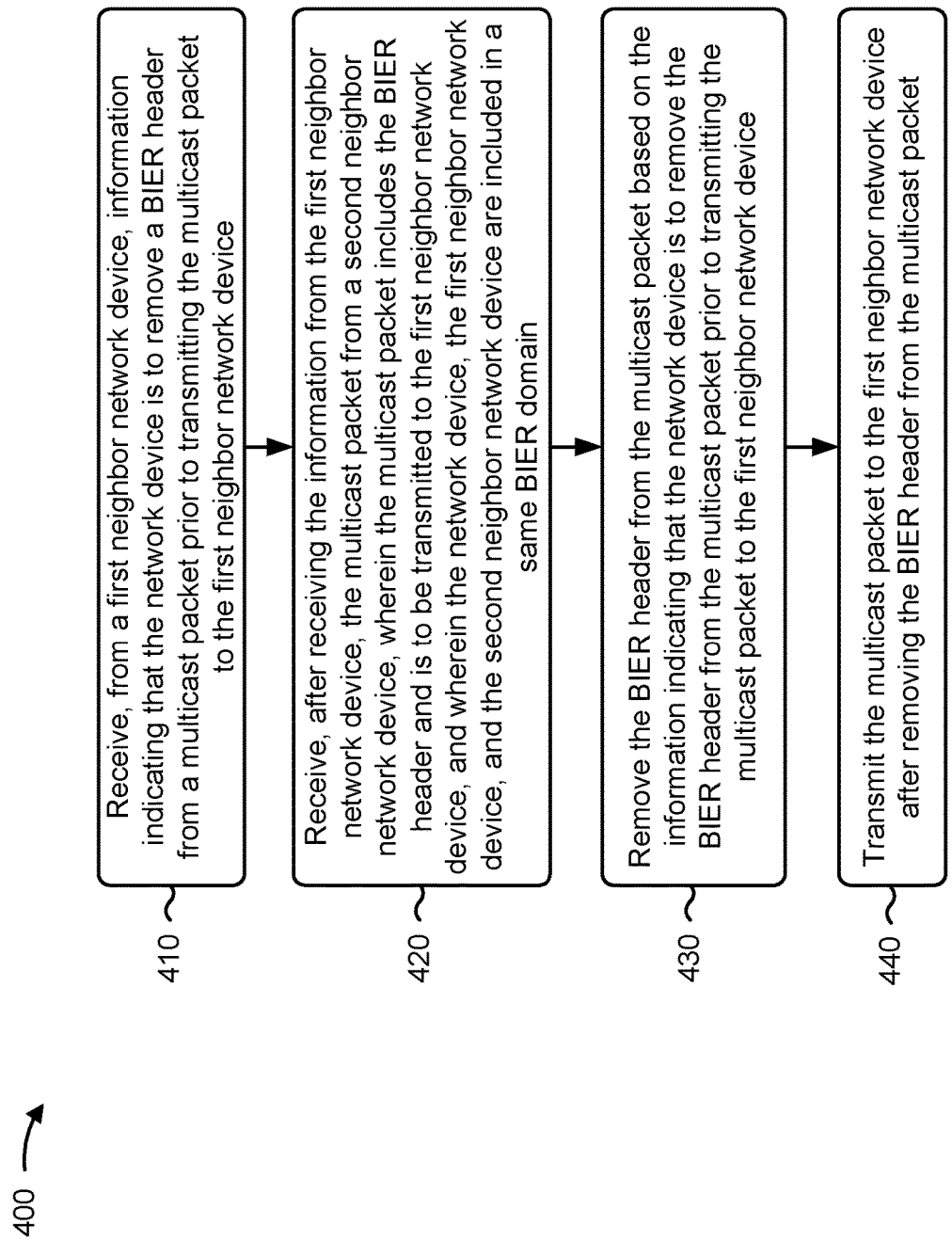

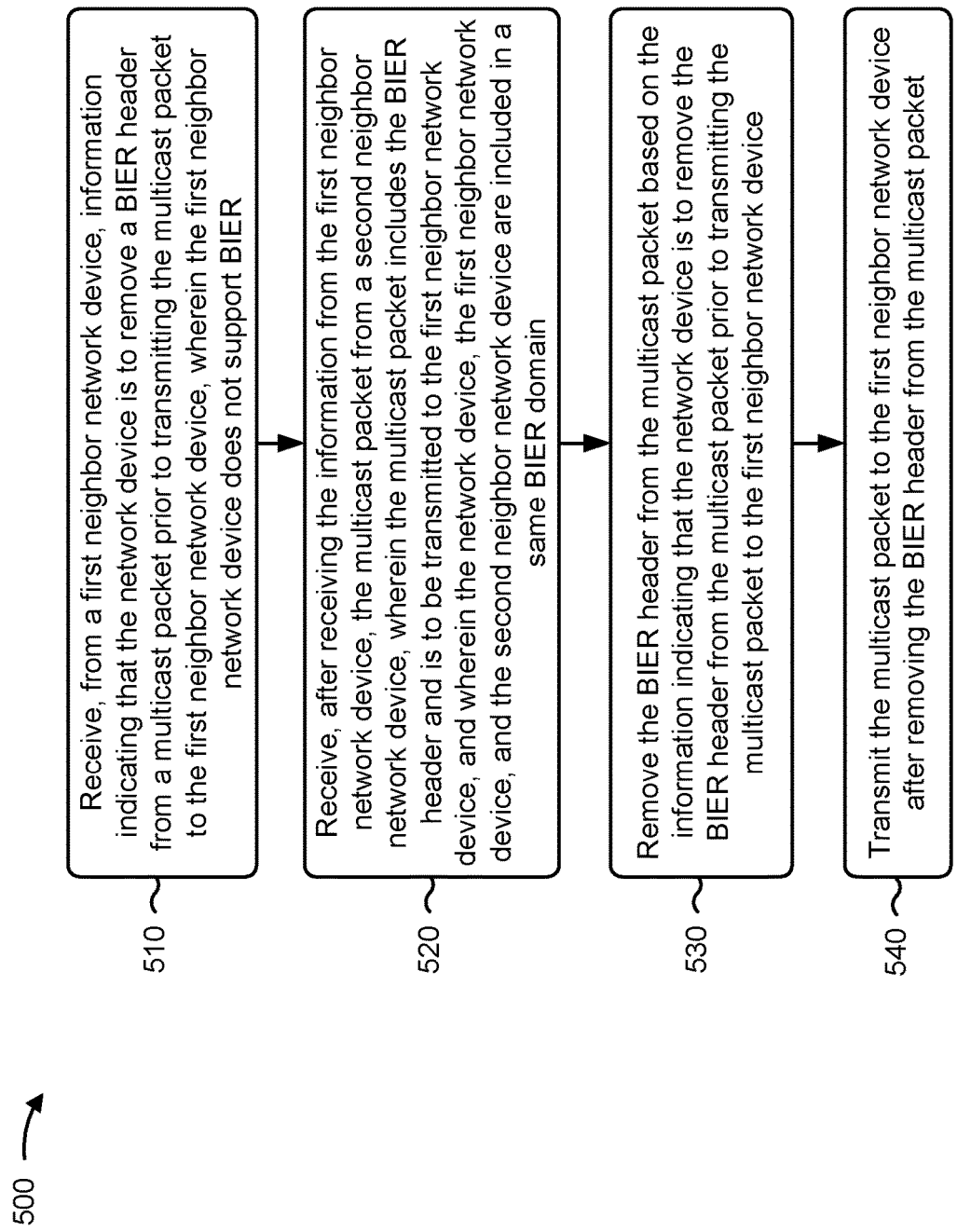

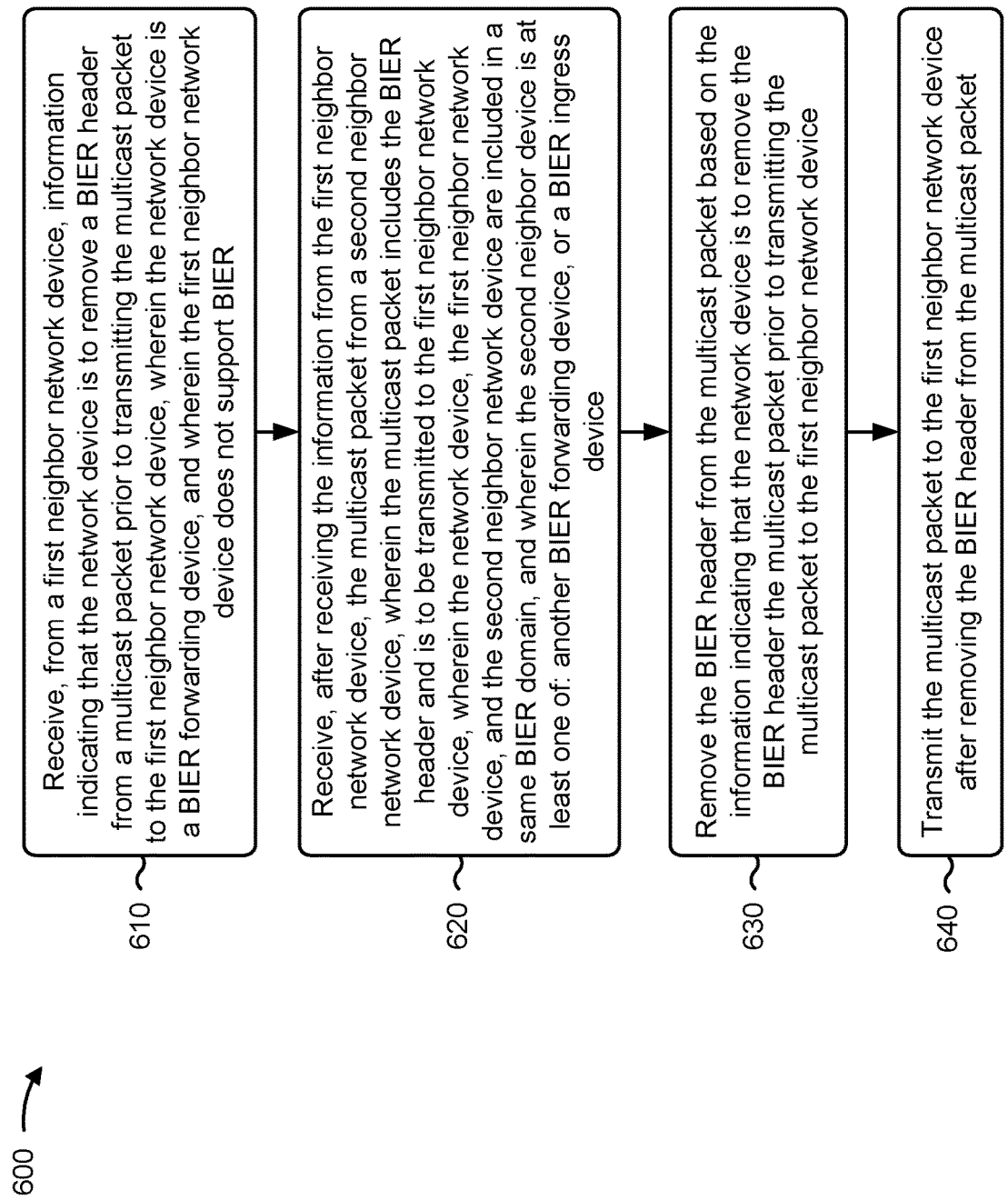

US 10,567,181 B2

BIT INDEX EXPLICIT REPLICATION (BIER) PENULTIMATE HOP POPPING

RELATED APPLICATION

This application is a Continuation-In-Part (CIP) of U.S. patent application Ser. No. 16/013,676, filed on Jun. 20, 2018, the content of which is incorporated by reference herein in its entirety.

BACKGROUND

Bit index explicit replication (BIER) is a communication protocol for forwarding multicast data packets between network devices. The network devices may use BIER to forward multicast data packets without having to build multicast distribution trees, maintain per-flow forwarding states, and/or the like.

SUMMARY

According to some implementations, a network device may include one or more memories, and one or more processors to receive, from a first neighbor network device, information indicating that the network device is to remove a BIER header from a multicast packet prior to transmitting the multicast packet to the first neighbor network device. The one or more processors may receive, after receiving the information from the first neighbor network device, the multicast packet from a second neighbor network device, wherein the multicast packet includes the BIER header and is to be transmitted to the first neighbor network device, and wherein the network device, the first neighbor network device, and the second neighbor network device are included in a same BIER domain. The one or more processors may remove the BIER header from the multicast packet based on the information indicating that the network device is to remove the BIER header from the multicast packet prior to transmitting the multicast packet to the first neighbor network device. The one or more processors may transmit the multicast packet to the first neighbor network device after removing the BIER header from the multicast packet.

According to some implementations, a non-transitory computer-readable medium may store instructions that include one or more instructions that, when executed by one or more processors of a network device, cause the one or more processors to receive, from a first neighbor network device, information indicating that the network device is to remove a BIER header from a multicast packet prior to transmitting the multicast packet to the first neighbor network device, wherein the first neighbor network device does not support BIER. The one or more instructions may cause the one or more processors to receive, after receiving the information from the first neighbor network device, the multicast packet from a second neighbor network device, wherein the multicast packet includes the BIER header and is to be transmitted to the first neighbor network device, and wherein the network device, the first neighbor network device, and the second neighbor network device are included in a same BIER domain. The one or more instructions may cause the one or more processors to remove the BIER header from the multicast packet based on the information indicating that the network device is to remove the BIER header from the multicast packet prior to transmitting the multicast packet to the first neighbor network device. The one or more instructions may cause the one or more processors to transmit the multicast packet to the first neighbor network device after removing the BIER header from the multicast packet.

According to some implementations, a method may include receiving, at a network device and from a first neighbor network device, information indicating that the network device is to remove a BIER header from a multicast packet prior to transmitting the multicast packet to the first neighbor network device, wherein the network device is a BIER forwarding device, and wherein the first neighbor network device does not support BIER. The method may include receiving, at the network device and after receiving the information from the first neighbor network device, the multicast packet from a second neighbor network device, wherein the multicast packet includes the BIER header and is to be transmitted to the first neighbor network device, wherein the network device, the first neighbor network device, and the second neighbor network device are included in a same BIER domain, and wherein the second neighbor network device is at least one of another BIER forwarding device, or a BIER ingress device. The method may include removing, by the network device, the BIER header from the multicast packet based on the information indicating that the network device is to remove the BIER header from the multicast packet prior to transmitting the multicast packet to the first neighbor network device. The method may include transmitting, by the network device, the multicast packet to the first neighbor network device after removing the BIER header from the multicast packet.

BRIEF DESCRIPTION OF THE DRAWINGS

FIG. 4 is a flow chart of an example process for BIER penultimate hop popping.

FIG. 5 is a flow chart of an example process for BIER penultimate hop popping.

FIG. 6 is a flow chart of an example process for BIER penultimate hop popping.

DETAILED DESCRIPTION

Figure 1A:
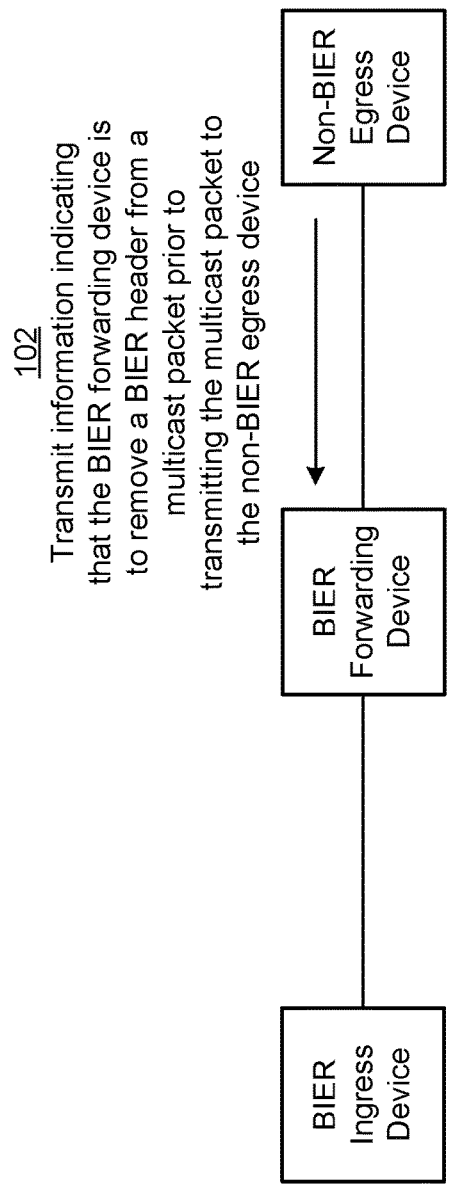
FIG. 1A-1C are diagrams of an example implementation described herein.

The following detailed description of example implementations refers to the accompanying drawings. The same reference numbers in different drawings may identify the same or similar elements.

A network device, such as a BIER-enabled device, may receive a multicast packet and forward the multicast packet to a neighbor network device by encapsulating the multicast packet with a BIER header in the multicast packet. The BIER header may include a bit string that identifies one or more destination network devices that are the intended recipients of the multicast packet. Each position in the bit string may correspond to a destination network device of the one or more destination network devices. For example, a bit string of 0011 may identify a first destination network device associated with BIER identifier 0001 and a second destination network device associated with BIER identifier 0010.

If the neighbor network device also supports BIER, the neighbor network device may receive the multicast packet with the BIER header and may determine where to transmit a copy of the multicast packet based on the bit string in the BIER header. To forward a copy of the multicast packet, the neighbor network device may identify the bit string in the BIER header, may identify a least significant bit (e.g., the rightmost bit) in the bit string that is set to a 1 value (e.g., 0001 in the bit string example above), and may perform a lookup in a bit index forwarding table (BIFT) associated with the neighbor network device based on the least significant bit. The neighbor network device may determine that the neighbor network device is to use the BIFT associated with the neighbor network device to perform the lookup based on identifying a BIER label included in the multicast packet (e.g., for a multiprotocol label switching (MPLS)-based BIER implementation), based on identifying a BIFT identifier included in the multicast packet (e.g., for a non-MPLS-based BIER implementation), and/or the like.

When performing the lookup, the neighbor network device may identify, in the BIFT, a BIER identifier associated with the least significant bit (e.g., the BIER identifier 0001 associated with the first destination network device) and may identify a forwarding bit mask and a bit forwarding neighbor device associated with the BIER identifier. The forwarding bit mask may identify one or more destination network devices that are reachable via the bit forwarding neighbor device associated with the forwarding bit mask. For example, a forwarding bit mask of 0001 may identify the first destination network device as being reachable via the bit forwarding neighbor device, a forwarding bit mask of 0011 may identify the first destination network device and the second destination network device as being reachable via the bit forwarding neighbor device, and so on.

The neighbor network device may generate a copy of the multicast packet, encapsulate the copy of the multicast packet in a BIER header, add a BIER label or a BIFT identifier associated with the bit forwarding neighbor device in front of the BIER header, and may transmit the copy of the multicast packet to the bit forwarding neighbor device. The BIER header of the copy of the multicast packet may include a bit string corresponding to the forwarding bit mask associated with the bit forwarding neighbor device. In some cases, the forwarding neighbor may be a neighbor of a plurality of intended recipients of the multicast packet, and thus the bit string of the copy of the multicast packet may represent the BIER identifiers associated with the plurality of intended recipients. In some cases, the bit forwarding neighbor device may receive the copy of the multicast packet and may perform actions similar to those performed by the neighbor network device, and the process may continue until all intended recipients of the multicast packet receive a copy of the multicast packet. In some cases, the bit forwarding neighbor device may be a destination of the multicast packet (e.g., the first destination network device), and thus the bit string may also represent the BIER identifier associated with the first destination network device.

In some cases, a network device may be a BIER-incapable device (referred to herein as a non-BIER device) if the network device does not support BIER. A non-BIER device may not be retrofittable to support BIER due to BIER functionality (e.g., the functionality to encapsulate a multicast packet in a BIER header, the functionality to recognize and understand a BIER header, the functionality to forward a multicast packet based on a BIER header, etc.) being implemented in forwarding plane hardware of a BIER-enabled device. Thus, a non-BIER device would have to be retrofitted with new forwarding plane hardware in order to support BIER, which may be impractical in a network of hundreds or thousands of non-BIER devices. This can make BIER difficult to implement in a brownfield deployment (i.e., an upgrade to an existing network), where BIER-enabled devices may coexist with non-BIER devices.

One technique to deploy BIER in a network including a non-BIER device is to tunnel BIER-encapsulated multicast packets through the non-BIER device using unicast tunnels. To tunnel a BIER-encapsulated multicast packet between a first BIER-enabled device and a second BIER-enabled device through a non-BIER device, the first BIER-enabled device may add an additional encapsulation layer onto the BIER-encapsulated multicast packet. In this way, the BIER-encapsulated multicast packet becomes the payload of the additional encapsulation layer. The additional encapsulation layer may be a header recognizable by the non-BIER device, such as an Ethernet header, a MPLS header, a user datagram protocol (UDP) header, and/or the like. The first non-BIER device may then transmit the BIER-encapsulated multicast packet with the additional encapsulation layer to the non-BIER device via a unicast tunnel, such as a MPLS tunnel, an Ethernet tunnel, a UDP tunnel, and/or the like. The non-BIER device may receive the BIER-encapsulated multicast packet with the additional encapsulation layer and may forward the BIER-encapsulated multicast packet with the additional encapsulation layer to the second BIER-enabled device using a second unicast tunnel.

While the above technique allows for the use of BIER in the presence of a non-BIER network device in some situations, the above technique cannot be used to tunnel a BIER-encapsulated multicast packet through a non-BIER network device that is a destination of the BIER-encapsulated multicast packet. This is because the destination of the BIER-encapsulated multicast packet is responsible for removing a BIER header from the BIER-encapsulated multicast packet, and if the destination is a non-BIER device, the non-BIER device will be incapable of removing the BIER header from the BIER-encapsulated multicast packet.

Some implementations described herein provide a network device that is capable of performing BIER penultimate hop popping. According to some implementations described herein, the network device may be included in a same BIER domain as a first neighbor network device and a second neighbor network device. The network device may receive, from a first neighbor network device, information indicating that the network device is to remove a BIER header from a multicast packet before transmitting the multicast packet to the first neighbor network device. In some implementations, the first neighbor network device may be a non-BIER network device. The network device may receive, after receiving the information from the first neighbor network device, the multicast packet from the second neighbor network device. The network device may remove the BIER header from the multicast packet based on the information indicating that the network device is to remove the BIER header from the multicast packet prior to transmitting the multicast packet to the first neighbor network device. The network device may transmit the multicast packet to the first neighbor network device after removing the BIER header from the multicast packet.

In this way, the network device performs BIER penultimate hop popping for the first neighbor network device by removing the BIER header from the multicast packet prior to transmitting the multicast packet to the first neighbor network device. This allows BIER to be deployed in a network in which one or more non-BIER devices function as a destination of a BIER-encapsulated multicast packet, which improves network operations and efficiency. Moreover, BIER penultimate hop popping may be used where a destination of a BIER-encapsulated multicast packet is a BIER-enabled egress device to reduce the quantity of lookups the BIER-enabled egress device is to perform in order to forward a multicast packet, which reduces processing and memory resource usage of the BIER-enabled egress device, reduces lookup times for the BIER-enabled egress device, and increases efficiency in the overall network.

Figure 1B:
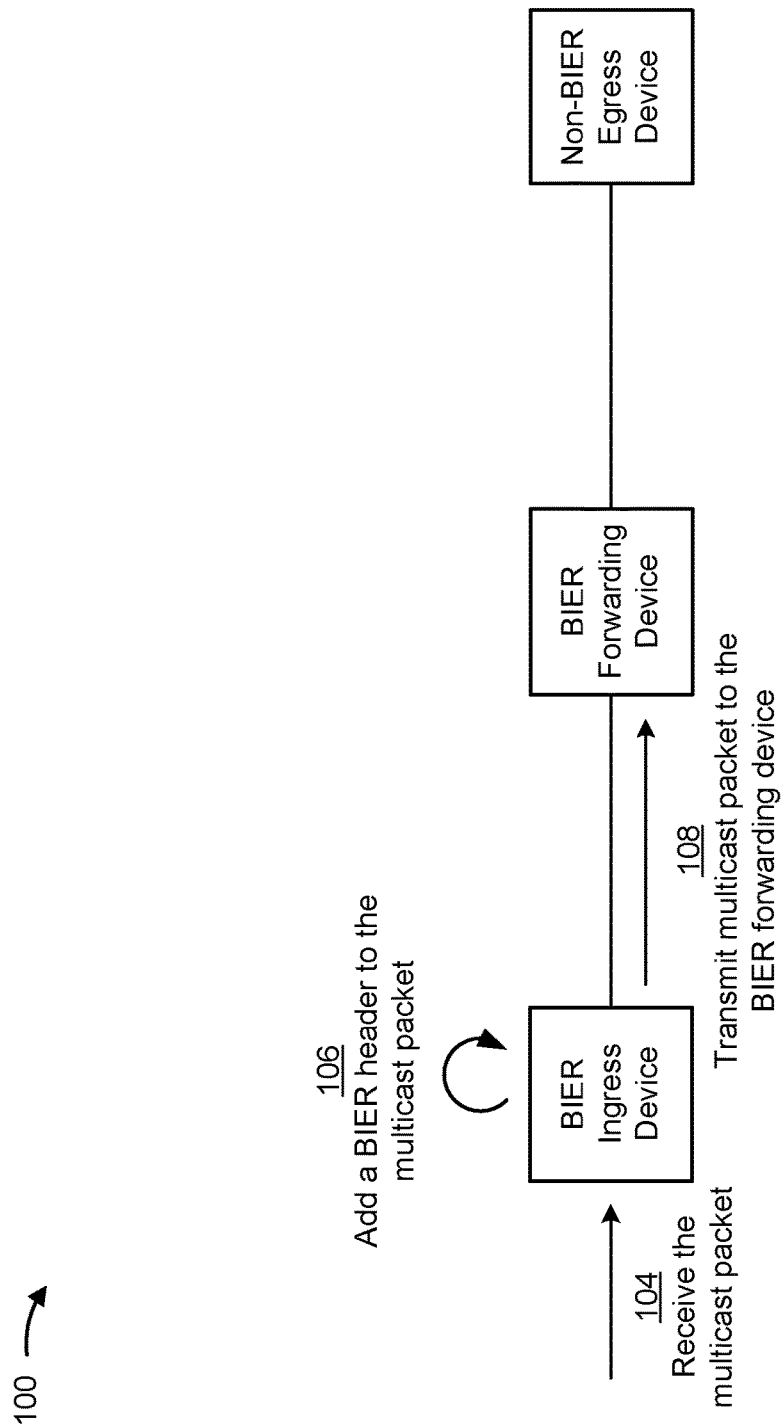
Figure 1C:
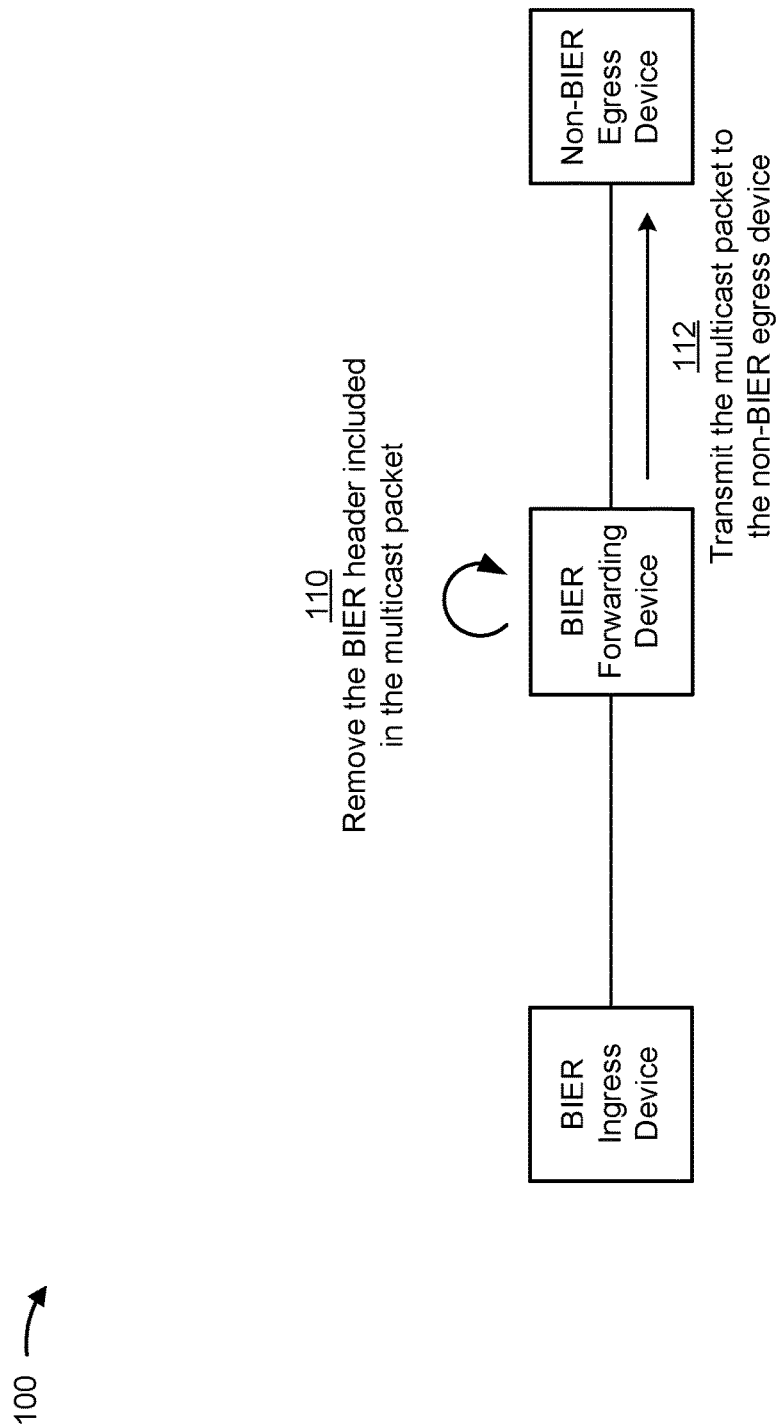

FIGS. 1A-1C are diagrams of an example implementation 100 described herein. As shown in FIGS. 1A-1C, example implementation 100 may include a plurality of network devices, such as a BIER ingress device, a non-BIER egress device, a BIER forwarding device, and/or the like. While FIGS. 1A-1C show a single non-BIER egress device communicatively connected with a single BIER forwarding device, in some implementations, the BIER forwarding device may be communicatively connected with a plurality of non-BIER egress devices and/or BIER egress devices, the BIER forwarding device may be communicatively connected with a plurality of BIER ingress devices, the non-BIER egress device may be communicatively connected with a plurality of BIER forwarding devices, and/or the like. Moreover, in some implementations, the non-BIER egress device may be a BIER-enabled egress device.

As shown in FIGS. 1A-1C, the BIER ingress device and the BIER forwarding device may be neighbors, and the BIER forwarding device and the non-BIER egress device may be neighbors. In some implementations, the BIER ingress device, the BIER forwarding device, and the non-BIER egress device may be included in a network, such as a multicast virtual private network (MVPN), a provider network, an Ethernet virtual private network (EVPN), and/or the like. For example, the BIER ingress device and the non-BIER egress device may each be a provider edge router (e.g., a router that interfaces with a router in another provider network, a router that interfaces with a customer edge router in a customer network, etc.) included in a provider network, and the BIER forwarding device may be a provider router (i.e., a transit router) included in the provider network.

In some implementations, the BIER ingress device, the BIER forwarding device, and the non-BIER egress device may be included in a BIER domain. The BIER domain may be a portion of the network in which BIER is used to forward or transmit multicast packets. In some implementations, the BIER ingress device, the BIER forwarding device, and/or the non-BIER egress device may be included in a plurality of BIER domains and may perform different functions and/or operations in the plurality of BIER domains. For example, the BIER ingress device, the BIER forwarding device, and the non-BIER egress device may be included in a first BIER domain, and the BIER ingress device may be included in a second BIER domain in which the BIER ingress device is a BIER egress device. Moreover, while FIGS. 1A-1C show the BIER domain including the BIER ingress device, the BIER forwarding device, and the non-BIER egress device, the BIER domain may include additional BIER ingress devices, additional BIER forwarding devices, additional non-BIER egress devices, one or more BIER egress devices, other types of devices, and/or the like.

The BIER ingress device may be a BIER-enabled network device that functions as an entry point for multicast packets into the BIER domain. The BIER ingress device may receive a multicast packet (e.g., from another network, from another BIER egress device in another BIER domain, and/or the like) and may determine one or more egress devices (e.g., the non-BIER egress device, a BIER egress device, etc.) in the BIER domain that are to receive a copy of the multicast packet. The BIER ingress device may encapsulate the multicast packet, based on determining the one or more egress devices, by adding a BIER header to the multicast packet. In some implementations, the BIER ingress device may also add a BIER label (e.g., for a MPLS-based BIER implementation) or a BIFT identifier (e.g., for a non-MPLS-based BIER implementation), associated with a next hop in a path to the one or more BIER egress devices, to the multicast packet. The BIER ingress device may transmit the BIER-encapsulated multicast packet to the next hop in the BIER domain. The BIER header of the multicast packet may include a bit string that includes information identifying the one or more BIER egress devices. For example, the bit string may be four bits in length (or any other length), and may be 0011, where the right-most 1 value (i.e., 0001) identifies a first egress device (e.g., the non-BIER device) and a second 1 value from the right (i.e., 0010) identifies a second egress device (e.g., a BIER egress device, another non-BIER egress device, etc.).

The BIER forwarding device may be a BIER-enabled network device that transmits BIER-encapsulated multicast packets to one or more other network devices within the BIER domain. For example, the BIER forwarding device may receive a BIER-encapsulated multicast packet (e.g., from the BIER ingress device, from another BIER forwarding device, etc.), may switch a BIER label or BIFT identifier, associated with the BIER forwarding device, included in the BIER-encapsulated multicast packet with a BIER label or BIFT identifier associated with an egress device included in the BIER domain, may update a bit string in a BIER header included in the BIER-encapsulated multicast packet to represent the BIER identifier associated with an egress device, and may transmit the BIER-encapsulated multicast packet to the egress device.

An egress device may be a network device that functions as an exit point for multicast packets in the BIER domain. A BIER egress device may be a BIER-enabled egress device that receives a BIER-encapsulated multicast packet, removes (or pops off) a BIER header, a BIER label, a BIFT identifier, and/or the like, from the BIER-encapsulated multicast packet, and transmits the payload of the BIER-encapsulated multicast packet (which may be a MPLS packet, an Ethernet packet, etc.) to one or more other network devices in another network (e.g., a customer network, another provider network, another MVPN, another EVPN, etc.), to one or more other network devices in another BIER domain, and/or the like.

In some implementations, an egress device included in the BIER domain may be a non-BIER device that does not support BIER, such as the non-BIER egress device. The non-BIER egress device may be unable to perform various BIER operations, such as reading and analyzing a BIER header included in a multicast packet, removing (or popping off) the BIER header, the BIER label, the BIFT identifier, and/or the like, from the multicast packet, and/or the like.

Turning to FIG. 1A, the non-BIER egress device may provide information to the BIER forwarding device so that the BIER forwarding device may perform one or more BIER operations for the non-BIER egress device. As shown by reference number 102, the non-BIER egress device may transmit, to the BIER forwarding device, information indicating that the non-BIER egress device is to remove a BIER header from a multicast packet prior to transmitting the multicast packet to the non-BIER egress device. In this way, the BIER forwarding device (the "penultimate" or second to last hop in the BIER domain) may perform BIER penultimate hop popping for the non-BIER egress device (the "ultimate" or last hop in the BIER domain).

In some implementations, such as an MPLS-based BIER implementation, the information indicating that the BIER forwarding device is to remove a BIER header from a multicast packet prior to transmitting the multicast packet to the non-BIER egress device may include information identifying a label associated with a BIER operation, such as an implicit null label. The BIER operation may be a pop operation, which may be an operation to remove the BIER header and a BIER label from the multicast packet. The non-BIER egress device may generate and transmit the label to the BIER forwarding device via a signaling packet, such as an interior gateway protocol (IGP) control plane signaling packet (e.g., an intermediate system to intermediate system (IS-IS) packet, an open shortest path first (OSPF) packet, etc.), which can be performed without changing forwarding plane hardware of the non-BIER egress device. For example, the non-BIER egress device may transmit the label in a type-length-value (TLV) field of an OSPF link-state advertisement (LSA) packet. As another example, the non-BIER egress device may transmit the label in a value field of a BIER sub-TLV of the signaling packet. The value field of the BIER sub-TLV may include a MPLS sub-TLV in which a value field of the MPLS sub-TLV may include information identifying the label. In this way, the BIER forwarding device may receive the label, and may remove, based the label being associated with the pop operation, the BIER header and the BIER label from the multicast packet.

In some implementations, the BIER forwarding device may store the label in a BIFT associated with the BIER forwarding device such that the label is associated with the non-BIER egress device in the BIFT associated with the BIER forwarding device. In this way, when the BIER forwarding device performs a lookup in the BIFT associated with the BIER forwarding device to transmit a multicast packet to the non-BIER egress device, the BIER forwarding device may identify the label, and may remove, based on identifying the label in the BIFT, a BIER header and a BIER label from the multicast packet prior to transmitting the multicast packet to the non-BIER egress device.

In some implementations, such as a non-MPLS based BIER implementation, the information indicating that the BIER forwarding device is to remove a BIER header from a multicast packet prior to transmitting the multicast packet to the non-BIER egress device may include a non-MPLS sub-TLV, such as a BIER penultimate hop popping sub-TLV associated with, dedicated to, and/or provisioned for, BIER penultimate hop popping. The non-BIER egress device may include the BIER penultimate hop popping sub-TLV in a value field of a BIER sub-TLV of a signaling packet. In this way, the BIER forwarding device may receive the signaling packet and may identify in a type field of the BIER penultimate hop popping sub-TLV, information indicating that the BIER forwarding device is to remove the BIER header, as well as a BIFT identifier, included in the multicast packet prior to transmitting the multicast packet to the non-BIER egress device. Thus, when the BIER forwarding device receives the multicast packet including the BIER header and the BIFT identifier, the BIER forwarding device may remove, based on receiving the signaling packet including the BIER penultimate hop popping sub-TLV, the BIER header and the BIFT identifier from the multicast packet prior to transmitting the multicast packet to the non-BIER egress device.

In some implementations, the BIER forwarding device may store, in the BIFT associated with the BIER forwarding device and based on receiving the signaling packet including the BIER penultimate hop popping sub-TLV, information indicating that the BIER forwarding device is to remove a BIER header and a BIFT identifier from a multicast packet prior to transmitting the multicast packet to the non-BIER egress device. In this way, when the BIER forwarding device receives a multicast packet and performs a lookup in the BIFT, associated with the BIER forwarding device, to transmit a multicast packet to the non-BIER egress device, the BIER forwarding device may identify the information, and may remove, based on identifying the information in the BIFT, a BIER header and a BIFT identifier from the multicast packet prior to transmitting the multicast packet to the non-BIER egress device.

In some implementations, the information indicating that the BIER forwarding device is to remove a BIER header from a multicast packet prior to transmitting the multicast packet to the non-BIER egress device may be included in a header of a packet (e.g., a signaling packet, a data packet, etc.), may be included in a payload of the packet, may be included in a preamble of the packet, and/or the like. In some implementations, the information indicating that the BIER forwarding device is to remove a BIER header from a multicast packet prior to transmitting the multicast packet to the non-BIER egress device may include a flag in a header of a packet (e.g., a signaling packet, a data packet, etc.), a value in a particular field in the packet, another type of TLV or sub-TLV, a payload of the packet, a notification, a message, and/or the like, indicating that the BIER forwarding device is to remove a BIER header from a multicast packet prior to transmitting the multicast packet to the non-BIER egress device. In some implementations, the BIER forwarding device may be provisioned (e.g., by a user) with the information indicating that the BIER forwarding device is to remove a BIER header from a multicast packet prior to transmitting the multicast packet to the non-BIER egress device. In some implementations, the BIER forwarding device may receive the information indicating that the BIER forwarding device is to remove a BIER header from a multicast packet prior to transmitting the multicast packet to the non-BIER egress device by another means or technique.

Turning to FIG. 1B, and as shown by reference number 104, the BIER ingress device may receive a multicast packet. In some implementations, the BIER ingress device may receive the multicast packet from a BIER egress device in another BIER domain, from a network device in another network, and/or the like. In some implementations, the BIER ingress device may receive the multicast packet after the non-BIER egress device transmitted, to the BIER forwarding device, the information indicating that the BIER forwarding device is to remove the BIER header from the multicast packet prior to transmitting the multicast packet to the non-BIER egress device.

As shown by reference number 106, the BIER ingress device may add a BIER header to the multicast packet. The BIER header may include a bit string that identifies one or more intended recipients of the multicast packet. For example, the bit string may include information identifying the non-BIER egress device as a destination for the multicast packet.

The BIER ingress device may generate the bit string based on information included in a BIFT associated with the BIER ingress device. For example, the BIER ingress device may perform a lookup in the BIFT associated with the BIER ingress device to identify a BIER identifier associated with the non-BIER egress device, and to identify a forwarding bit mask and a forwarding neighbor device associated with the BIER identifier associated with the non-BIER egress device. In the example shown in FIGS. 1A-1C, the non-BIER egress device may be reachable via the BIER forwarding device, and the BIER forwarding device may be a neighbor of the BIER ingress device. Accordingly, the BIER ingress device may determine that the BIER forwarding device is the bit forwarding neighbor for the non-BIER egress device (i.e., a next hop in a route to the non-BIER egress device). Thus, the BIER ingress device may generate the bit string for the BIER header of the multicast packet so that the bit string includes information identifying the forwarding bit mask associated with the BIER forwarding device.

As an example of the above, the non-BIER egress device may be assigned a BIER identifier of 0001. Accordingly, the forwarding bit mask associated with the BIER forwarding device may be 0001, since the non-BIER egress device is the only egress device reachable via the BIER forwarding device in the example illustrated in FIGS. 1A-1C. As a result, the bit string included in the BIER header of the multicast packet is 0001.

In some implementations, such as a MPLS-based BIER implementation, the BIER ingress device may add a BIER label to the multicast packet. The BIER label may be, for example, a BIER label associated with the next hop in a path to the non-BIER egress device (i.e., the destination for the multicast packet). In the example shown in FIGS. 1A-1C, the next hop in the path to the non-BIER egress device may be the BIER forwarding device. Accordingly, the BIER ingress device may add the BIER label, associated with the BIER forwarding device, to the multicast packet. The BIER ingress device may identify the BIER label associated with the BIER forwarding device in the BIFT associated with the BIER ingress device. The BIER label associated with the BIER forwarding device may indicate to the BIER forwarding device that the multicast packet is a BIER-encapsulated multicast packet, and that the BIER forwarding device is to perform a lookup in a BIFT associated with the BIER forwarding device to forward the multicast packet. In some implementations, such as a non-MPLS-based BIER implementation, the BIER egress device may add a BIFT identifier to the multicast packet to indicate, to the BIER forwarding device, that the BIER forwarding device is to perform a lookup in the BIFT associated with the BIER forwarding device to forward the multicast packet.

As shown by reference number 108, the BIER ingress device may transmit the multicast packet to the BIER forwarding device after adding the BIER header and the BIER label or the BIFT identifier to the multicast packet. The BIER forwarding device may receive the multicast packet.

Turning now to FIG. 1C, and as shown by reference number 110, the BIER forwarding device may remove the BIER header included in the multicast packet based on receiving the information indicating that the BIER forwarding device is to remove the BIER header included in the multicast packet prior to transmitting the multicast packet to the non-BIER egress device. In some implementations, such as a MPLS-based BIER implementation, the BIER forwarding device may identify, based on receiving the multicast packet, a BIER label included in the multicast packet. The BIER forwarding device may determine that the BIER label included in the multicast packet is associated with the BIER forwarding device. Based on identifying the BIER label included in the multicast packet, the BIER forwarding device may use the BIFT associated with the BIER forwarding device to process the multicast packet.

To process the multicast packet, the BIER forwarding device may identify the bit string included in the BIER header of the multicast packet, and may perform a lookup in the BIFT associated with the BIER forwarding device based on the identified bit string. Continuing the example from above, the bit string included in the BIER header of the multicast packet may be 0001, which may be the BIER identifier associated with the non-BIER egress device. Accordingly, the BIER forwarding device may identify the least significant bit in the bit string (e.g., the right-most bit having a value of 1 in the bit string), and identify a BIER identifier, included in the BIFT associated with the BIER forwarding device, corresponding to the BIER identifier associated with the non-BIER egress device. Once the BIER forwarding device has identified the BIER identifier (i.e., the BIER identifier associated with the non-BIER egress device) in the BIFT associated with the BIER forwarding device, the BIER forwarding device may identify a bit forwarding mask and a BIER label associated with a next hop in the route to the non-BIER egress device.

Since the non-BIER egress device is the neighbor of the BIER forwarding device, the non-BIER egress device may be the next hop. Accordingly, the BIER forwarding device may identify, in the BIFT associated with the BIER forwarding device, the BIER label associated with the non-BIER egress device. As explained above, the label associated with the non-BIER egress device may be the implicit null label or another label that indicates the BIER forwarding device is to remove (or pop off) the BIER header and the BIER label included in the multicast packet. Accordingly, the BIER forwarding device may remove the BIER header and the BIER label included in the multicast packet based on identifying, in the BIFT associated with the BIER forwarding device, the BIER label associated with the non-BIER egress device.

In some implementations, such as a non-MPLS-based BIER implementation, the BIER forwarding device may identify, based on receiving the multicast packet, a BIFT identifier included in the multicast packet. Based on identifying the BIFT identifier included in the multicast packet, the BIER forwarding device may use the BIFT associated with the BIER forwarding device to process the multicast packet. To process the multicast packet, the BIER forwarding device may identify the bit string included in the BIER header of the multicast packet, and may perform a lookup in the BIFT associated with the BIER forwarding device based on the identified bit string. Once the BIER forwarding device has identified the BIER identifier (i.e., the BIER identifier associated with the non-BIER egress device) in the BIFT associated with the BIER forwarding device, the BIER forwarding device may identify a bit forwarding mask and a BIER label associated with a next hop in the route to the non-BIER egress device. Since the non-BIER egress device is the neighbor of the BIER forwarding device, the non-BIER egress device may be the next hop. Accordingly, the BIER forwarding device may identify, in the BIFT associated with the BIER forwarding device, the information indicating that the BIER forwarding device is to remove (or pop off) the BIER header and the BIFT identifier included in the multicast packet, and may remove the BIER header and the BIFT identifier included in the multicast packet based on identifying the information.

As shown by reference number 112, the BIER forwarding device may transmit the multicast packet to the non-BIER egress device after removing the BIER header (and the BIER label or the BIFT identifier) from the multicast packet. In some implementations, the BIER forwarding device may transmit the multicast packet to the non-BIER egress device by using MPLS (e.g., by identifying a MPLS label included in the multicast packet and performing a lookup in a label forwarding information base (LFIB) based on the identified MPLS label), by identifying an address (e.g., an Internet protocol (IP) version 4 (IPv4) address, an IP version 6 (IPv6) address, and/or the like) included in the multicast packet and performing a lookup in a forwarding information base (FIB) based on the identified address, and/or the like.

The non-BIER egress device may receive the multicast packet and may transmit the multicast packet to one or more other network devices (e.g., one or more other network devices in another network, one or more other network devices in the same network, and/or the like).

In this way, the BIER forwarding device performs BIER penultimate hop popping for the non-BIER egress device by removing a BIER header from a multicast packet prior to transmitting the multicast packet to the non-BIER egress device. This allows BIER to be deployed in a network in which one or more non-BIER devices function as a destination of a BIER-encapsulated multicast packet, which improves network operations and efficiency.

Moreover, in this way, BIER penultimate hop popping may be used where the non-BIER egress device is a BIER-enabled egress device to reduce the quantity of lookups the BIER-enabled egress device is to perform in order to forward a multicast packet. For example, if the BIER-enabled egress device receives a multicast packet with a BIER header, the BIER-enabled egress device may perform a first look-up in a BIFT associated with the BIER-enabled egress device, may determine to remove the BIER header from the multicast packet based on the lookup in the BIFT, and may perform a second look-up (e.g., a lookup in a LFIB, a lookup in a FIB, etc.) to forward the multicast packet to the next hop. By having the BIER forwarding device remove the BIER header prior to transmitting the multicast packet to the BIER-enabled egress device, the BIER-enabled egress device performs the look-up in the LFIB, FIB, and/or the like without having to first perform the look-up in the BIFT. This reduces processing and memory resource usage of the BIER-enabled egress device, reduces lookup times for the BIER-enabled egress device, and increases efficiency in the overall network.

As indicated above, FIGS. 1A-1C are provided merely as an example. Other examples are possible and may differ from what was described with regard to FIGS. 1A-1C.

Figure 2:
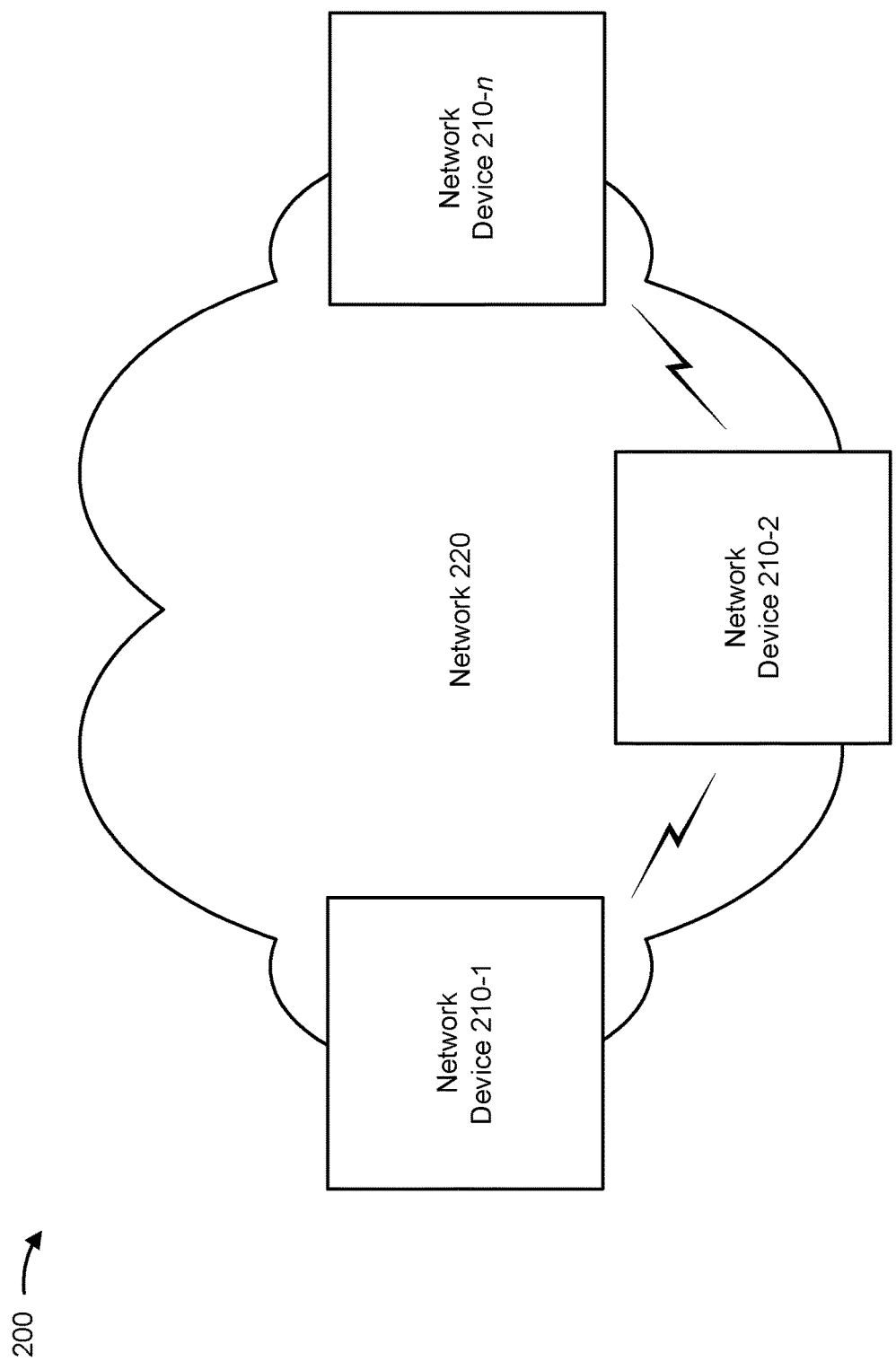
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-k (k≥1) (hereinafter referred to collectively as "network devices 210," and individually as "network device 210") and a network 220. Devices of environment 200 may interconnect via wired connections, wireless connections, or a combination of wired and wireless connections. In some implementations, network devices 210 may be included in the same BIER domain.

Network device 210 includes one or more devices capable of receiving, providing, storing, generating, and/or processing information. In some implementations, network device 210 may include a firewall, a router, a gateway, a switch, a bridge, a wireless access point, a base station (e.g., eNodeB, NodeB, gNodeB, and/or the like), and/or the like. In some implementations, network device 210 may be implemented as a physical device implemented within a housing, such as a chassis. In some implementations, network device 210 may be implemented as a virtual device implemented by one or more computer devices of a cloud computing environment or a data center.

In some implementations, network device 210 may be a BIER-enabled BIER forwarding device that transmits BIER-encapsulated multicast packets to one or more other network devices within a BIER domain, may be a BIER-enabled ingress device that functions as an entry point for multicast packets into the BIER domain, or may be an egress device that functions as an exit point for multicast packets in the BIER domain. In some implementations, the egress device may be a non-BIER egress device that transmits information to the BIER forwarding device, and the BIER forwarding device may, based on the information and upon receiving a multicast packet from the BIER ingress device, remove a BIER header, a BIER label, a BIFT identifier, and/or the like, from the multicast packet before transmitting the multicast packet to the non-BIER egress device. In this way, network devices 210 (i.e., the BIER ingress device, the BIER forwarding device, and the non-BIER egress device) allow BIER to be deployed in a network (e.g., network 220) in which one or more non-BIER devices function as a destination of a BIER-encapsulated multicast packet.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network WAN), a metropolitan area network (MAN), a telephone network (e.g., a public switched telephone network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
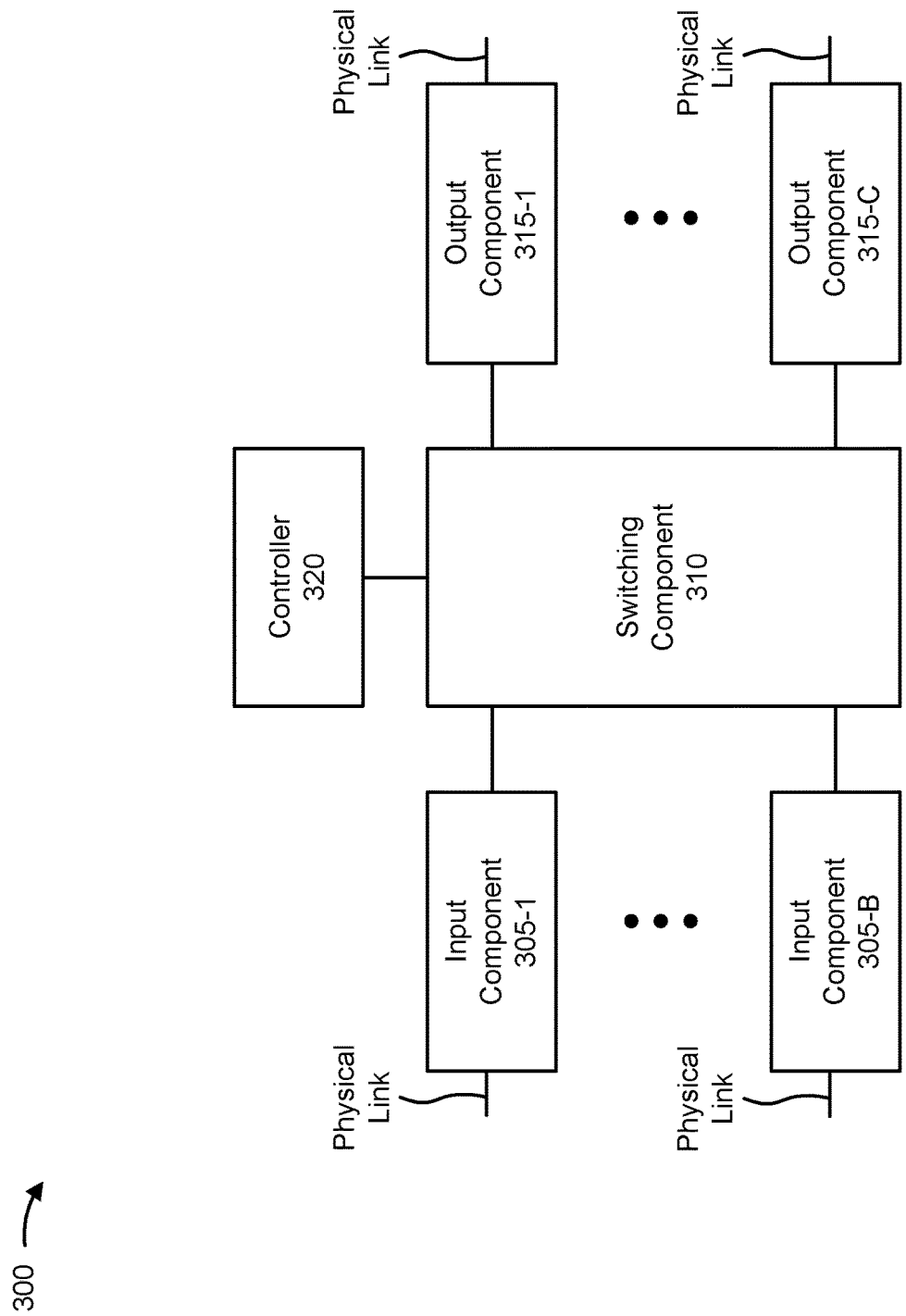
FIG. 3 is a diagram of example components of one or more devices of FIG. 2.

FIG. 3 is a diagram of example components of a device 300. Device 300 may correspond to one or more of network devices 210. In some implementations, one or more of network devices 210 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 320 may include one or more processors that may be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes based on executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for BIER penultimate hop popping. In some implementations, one or more process blocks of FIG. 4 may be performed by a network device (e.g., network device 210). In some implementations, one or more process blocks of FIG. 4 may be performed by another device or a group of devices separate from or including the network device, such as a different network device 210 and/or a plurality of network devices 210.

As shown in FIG. 4, process 400 may include receiving, from a first neighbor network device, information indicating that the network device is to remove a BIER header from a multicast packet prior to transmitting the multicast packet to the first neighbor network device (block 410). For example, the network device (e.g., using input component 305, switching component 310, controller 320, and/or the like) may receive, from a first neighbor network device, information indicating that the network device is to remove a BIER header from a multicast packet prior to transmitting the multicast packet to the first neighbor network device, as described above in connection with FIGS. 1A-1C.

As further shown in FIG. 4, process 400 may include receiving, after receiving the information from the first neighbor network device, the multicast packet from a second neighbor network device, wherein the multicast packet includes the BIER header and is to be transmitted to the first neighbor network device, and wherein the network device, the first neighbor network device, and the second neighbor network device are included in a same BIER domain (block 420). For example, the network device (e.g., using input component 305, switching component 310, controller 320, and/or the like) may receive, after receiving the information from the first neighbor network device, the multicast packet from a second neighbor network device, as described above in connection with FIGS. 1A-1C. In some implementations, the multicast packet may include the BIER header and is to be transmitted to the first neighbor network device. In some implementations, the network device, the first neighbor network device, and the second neighbor network device may be included in a same BIER domain As further shown in FIG. 4, process 400 may include removing the BIER header from the multicast packet based on the information indicating that the network device is to remove the BIER header from the multicast packet prior to transmitting the multicast packet to the first neighbor network device (block 430). For example, the network device (e.g., using input component 305, switching component 310, output component 315, controller 320, and/or the like) may remove the BIER header from the multicast packet based on the information indicating that the network device is to remove the BIER header from the multicast packet prior to transmitting the multicast packet to the first neighbor network device, as described above in connection with FIGS. 1A-1C.

As further shown in FIG. 4, process 400 may include transmitting the multicast packet to the first neighbor network device after removing the BIER header from the multicast packet (block 440). For example, the network device (e.g., using switching component 310, output component 315, controller 320, and/or the like) may transmit the multicast packet to the first neighbor network device after removing the BIER header from the multicast packet, as described above in connection with FIGS. 1A-1C.

Process 400 may include additional implementations, such as any single implementation or any combination of implementations described below and/or described with regard to any other process described herein.

In some implementations, the first neighbor network device may be at least one of a BIER egress device or an egress device that does not support BIER. In some implementations, the network device may be a BIER forwarding device, and the second neighbor network device may be at least one of another BIER forwarding device or a BIER egress device.

In some implementations, the information indicating that the network device is to remove the BIER header from the multicast packet prior to transmitting the multicast packet to the first neighbor network device may include a label indicating removal of the BIER header included in the multicast packet. In some implementations, the label indicating removal of the BIER header may include an implicit null label.

In some implementations, the information indicating that the network device is to remove the BIER header from the multicast packet prior to transmitting the multicast packet to the first neighbor network device may be included in a type field of a sub-TLV field included in signaling packet, wherein the type field of the sub-TLV field is associated with removal of the BIER header. In some implementations, the BIER header included the multicast packet may be at least one of MPLS encapsulated or non-MPLS encapsulated.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for BIER penultimate hop popping. In some implementations, one or more process blocks of FIG. 5 may be performed by a network device (e.g., network device 210). In some implementations, one or more process blocks of FIG. 5 may be performed by another device or a group of devices separate from or including the network device, such as a different network device 210 and/or a plurality of network devices 210.

As shown in FIG. 5, process 500 may include receiving, from a first neighbor network device, information indicating that the network device is to remove a BIER header from a multicast packet prior to transmitting the multicast packet to the first neighbor network device, wherein the first neighbor network device does not support BIER (block 510). For example, the network device (e.g., using input component 305, switching component 310, controller 320, and/or the like) may receive, from a first neighbor network device, information indicating that the network device is to remove a BIER header from a multicast packet prior to transmitting the multicast packet to the first neighbor network device, as described above in connection with FIGS. 1A-1C. In some implementations, the first neighbor network device may not support BIER.

As further shown in FIG. 5, process 500 may include receiving, after receiving the information from the first neighbor network device, the multicast packet from a second neighbor network device, wherein the multicast packet includes the BIER header and is to be transmitted to the first neighbor network device, and wherein the network device, the first neighbor network device, and the second neighbor network device are included in a same BIER domain (block 520). For example, the network device (e.g., using input component 305, switching component 310, controller 320, and/or the like) may receive, after receiving the information from the first neighbor network device, the multicast packet from a second neighbor network device, as described above in connection with FIGS. 1A-1C. In some implementations, the multicast packet may include the BIER header and is to be transmitted to the first neighbor network device. In some implementations, the network device, the first neighbor network device, and the second neighbor network device may be included in a same BIER domain.

As further shown in FIG. 5, process 500 may include removing the BIER header from the multicast packet based on the information indicating that the network device is to remove the BIER header from the multicast packet prior to transmitting the multicast packet to the first neighbor network device (block 530). For example, the network device (e.g., using input component 305, switching component 310, output component 315, controller 320, and/or the like) may remove the BIER header from the multicast packet based on the information indicating that the network device is to remove the BIER header from the multicast packet prior to transmitting the multicast packet to the first neighbor network device, as described above in connection with FIGS. 1A-1C.

As further shown in FIG. 5, process 500 may include transmitting the multicast packet to the first neighbor network device after removing the BIER header from the multicast packet (block 540). For example, the network device (e.g., using switching component 310, output component 315, controller 320, and/or the like) may transmit the multicast packet to the first neighbor network device after removing the BIER header from the multicast packet, as described above in connection with FIGS. 1A-1C.

Process 500 may include additional implementations, such as any single implementation or any combination of implementations described below and/or described with regard to any other process described herein.

In some implementations, the BIER header included in the multicast packet may be at least one of MPLS encapsulated or non-MPLS encapsulated.

In some implementations, the information indicating that the network device is to remove the BIER header from the multicast packet prior to transmitting the multicast packet to the first neighbor network device may be included in a type field of a sub-TLV field included in a signaling packet, wherein the type field of the sub-TLV field is associated with removal of the BIER header. In some implementations, wherein the information indicating that the network device is to remove the BIER header from the multicast packet prior to transmitting the multicast packet to the first neighbor network device may include a label indicating removal of the BIER header included in the multicast packet.

In some implementations, the second neighbor network device may be at least one of a BIER ingress device or another BIER forwarding device. In some implementations, the network device may be a BIER forwarding device. In some implementations, the information indicating that the network device is to remove the BIER header from the multicast packet prior to transmitting the multicast packet to the first neighbor network device may include a label including an implicit null label.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for BIER penultimate hop popping. In some implementations, one or more process blocks of FIG. 6 may be performed by a network device (e.g., network device 210). In some implementations, one or more process blocks of FIG. 6 may be performed by another device or a group of devices separate from or including the network device, such as a different network device 210 and/or a plurality of network devices 210.

As shown in FIG. 6, process 600 may include receiving, from a first neighbor network device, information indicating that the network device is to remove a BIER from a multicast packet prior to transmitting the multicast packet to the first neighbor network device, wherein the network device is a BIER forwarding device, and wherein the first neighbor network device does not support BIER (block 610). For example, the network device (e.g., using input component 305, switching component 310, controller 320, and/or the like) may receive, from a first neighbor network device, information indicating that the network device is to remove a BIER header from a multicast packet prior to transmitting the multicast packet to the first neighbor network device, as described above in connection with FIGS. 1A-1C. In some implementations, the network device may be a BIER forwarding device. In some implementations, the first neighbor network device may not support BIER.

As further shown in FIG. 6, process 600 may include receiving, after receiving the information from the first neighbor network device, the multicast packet from a second neighbor network device, wherein the multicast packet includes the BIER header and is to be transmitted to the first neighbor network device, wherein the network device, the first neighbor network device, and the second neighbor network device are included in a same BIER domain, and wherein the second neighbor network device is another BIER forwarding device and/or a BIER ingress device (block 620). For example, the network device (e.g., using input component 305, switching component 310, controller 320, and/or the like) may receive, after receiving the information from the first neighbor network device, the multicast packet from a second neighbor network device, as described above in connection with FIGS. 1A-1C. In some implementations, the multicast packet may include the BIER header and is to be transmitted to the first neighbor network device. In some implementations, the network device, the first neighbor network device, and the second neighbor network device are included in a same BIER domain. In some implementations, the second neighbor network device may be another BIER forwarding device, and/or a BIER ingress device.

As further shown in FIG. 6, process 600 may include removing the BIER header from the multicast packet based on the information indicating that the network device is to remove the BIER header from the multicast packet prior to transmitting the multicast packet to the first neighbor network device (block 630). For example, the network device (e.g., using input component 305, switching component 310, output component 315, controller 320, and/or the like) may remove the BIER header from the multicast packet based on the information indicating that the network device is to remove the BIER header from the multicast packet prior to transmitting the multicast packet to the first neighbor network device, as described above in connection with FIGS. 1A-1C.

As further shown in FIG. 6, process 600 may include transmitting the multicast packet to the first neighbor network device after removing the BIER header from the multicast packet (block 640). For example, the network device (e.g., using switching component 310, output component 315, controller 320, and/or the like) may transmit the multicast packet to the first neighbor network device after removing the BIER header from the multicast packet, as described above in connection with FIGS. 1A-1C.

Process 600 may include additional implementations, such as any single implementation or any combination of implementations described below and/or described with regard to any other process described herein.

In some implementations, the information indicating that the network device is to remove the BIER header from the multicast packet prior to transmitting the multicast packet to the first neighbor network device may be included in a value field of a sub-TLV field included in a signaling packet. In some implementations, the information indicating that the network device is to remove the BIER header from the multicast packet prior to transmitting the multicast packet to the first neighbor network device may include a type field, associated with removing the BIER header from the multicast packet, of another sub-TLV field included in the value field of the sub-TLV field.

In some implementations, wherein the information indicating that the network device is to remove the BIER header from the multicast packet prior to transmitting the multicast packet to the first neighbor network device may include a label indicating removal of the BIER header included in the multicast packet. In some implementations, the label indicating removal of the BIER header may include an implicit null label.

In some implementations, the network device, the first neighbor network device, and the second neighbor network device may be included in at least one of a MVPN or an EVPN.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide a network device 210 that is capable of performing BIER penultimate hop popping. According to some implementations described herein, the network device 210 may be included in a same BIER domain as a first neighbor network device 210 and a second neighbor network device 210. The network device 210 may receive, from a first neighbor network device 210, information indicating that the network device 210 is to remove a BIER header from a multicast packet before transmitting the multicast packet to the first neighbor network device 210. The network device 210 may receive, after receiving the information from the first neighbor network device 210, the multicast packet from the second neighbor network device 210. The network device 210 may remove the BIER header from the multicast packet based on the information indicating that the network device 210 is to remove the BIER header from the multicast packet prior to transmitting the multicast packet to the first neighbor network device 210. The network device may transmit the multicast packet to the first neighbor network device 210 after removing the BIER header from the multicast packet. In this way, the network device 210 performs BIER penultimate hop popping for the first neighbor network device 210 by removing the BIER header from the multicast packet prior to transmitting the multicast packet to the first neighbor network device 210. This allows BIER to be deployed in a network 220 in which one or more non-BIER devices function as a destination of a BIER-encapsulated multicast packet, which improves network operations and efficiency.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
   one or more memories; and
   one or more processors to:
     receive, from a first neighbor network device, information indicating that the network device is to remove a bit indexed explicit replication (BIER) header from a multicast packet prior to transmitting the multicast packet to the first neighbor network device;
     receive, after receiving the information from the first neighbor network device, the multicast packet from a second neighbor network device,
       wherein the multicast packet includes the BIER header and is to be transmitted to the first neighbor network device, and
       wherein the network device, the first neighbor network device, and the second neighbor network device are included in a same BIER domain;
     remove the BIER header from the multicast packet based on the information indicating that the network device is to remove the BIER header from the multicast packet prior to transmitting the multicast packet to the first neighbor network device; and
     transmit the multicast packet to the first neighbor network device, after removing the BIER header from the multicast packet, by using at least one of a multiprotocol label switching (MPLS) label associated with the first neighbor network device or an address associated with the first neighbor network device,
       wherein the multicast packet includes the at least one of the MPLS label or the address.

2. The network device of claim 1, wherein the first neighbor network device is at least one of:
   a BIER egress device, or
   an egress device that does not support BIER.

3. The network device of claim 1, wherein the network device is a BIER forwarding device, and
   wherein the second neighbor network device is at least one of:
     another BIER forwarding device, or
     a BIER ingress device.

4. The network device of claim 1, wherein the information indicating that the network device is to remove the BIER header from the multicast packet prior to transmitting the multicast packet to the first neighbor network device comprises:
   a label indicating removal of the BIER header from the multicast packet.

5. The network device of claim 1, wherein the information indicating that the network device is to remove the BIER header from the multicast packet prior to transmitting the multicast packet to the first neighbor network device is included in type field of a sub-type-length-value (sub-TLV) field included in a signaling packet,
   wherein the type field of the sub-TLV field is associated with removal of the BIER header.

6. The network device of claim 1, wherein the BIER header before being removed from the multicast packet, MPLS encapsulated.

7. The network device of claim 1, wherein the multicast packet includes:
a BIER label for a MPLS-based BIER implementation, or
a bit index forwarding table (BIFT) identifier for a non-MPLS-based BIER implementation; and
wherein the one or more processors, when removing the BIER header from the multicast packet, are to:
remove the BIER label or the BIFT identifier from the multicast packet.

8. A non-transitory computer-readable medium storing instructions, the instructions comprising:
one or more instructions that, when executed by one or more processors of a network device, cause the one or more processors to:
receive, from a first neighbor network device, information indicating that the network device is to remove a bit indexed explicit replication (BIER) header from a multicast packet prior to transmitting the multicast packet to the first neighbor network device,
wherein the first neighbor network device does not support BIER;
receive, after receiving the information from the first neighbor network device, the multicast packet from a second neighbor network device,
wherein the multicast packet includes the BIER header and is to be transmitted to the first neighbor network device, and
wherein the network device, the first neighbor network device, and the second neighbor network device are included in a same BIER domain;
remove the BIER header from the multicast packet based on the information indicating that the network device is to remove the BIER header from the multicast packet prior to transmitting the multicast packet to the first neighbor network device; and
transmit the multicast packet to the first neighbor network device, after removing the BIER header from the multicast packet, by using at least one of a multiprotocol label switching (MPLS) label associated with the first neighbor network device or an address associated with the first neighbor network device,
wherein the multicast packet includes the at least one of the MPLS label or the address.

9. The non-transitory computer-readable medium of claim 8, wherein the BIER header, before being removed from the multicast packet, is non-MPLS encapsulated.

10. The non-transitory computer-readable medium of claim 8, wherein the information indicating that the network device is to remove the BIER header from the multicast packet prior to transmitting the multicast packet to the first neighbor network device is included in a type field of a sub-type-length-value (sub-TLV) field included in a signaling packet,
wherein the type field of the sub-TLV field is associated with removal of the BIER header.

11. The non-transitory computer-readable medium of claim 8, wherein the information indicating that the network device is to remove the BIER header from the multicast packet prior to transmitting the multicast packet to the first neighbor network device comprises:
a label indicating removal of the BIER header included in the multicast packet.

12. The non-transitory computer-readable medium of claim 8, wherein the second neighbor network device is at least one of:
a BIER ingress device, or
another BIER forwarding device.

13. The non-transitory computer-readable medium of claim 8, wherein the network device is a BIER forwarding device.

14. The non-transitory computer-readable medium of claim 8, wherein the multicast packet includes:
a BIER label for a MPLS-based BIER implementation, or
a bit index forwarding table (BIFT) identifier for a non-MPLS-based BIER implementation; and
wherein the one or more instructions, that cause the one or more processors to remove the BIER header from the multicast packet, cause the one or more processors to:
remove the BIER label or the BIFT identifier from the multicast packet.

15. A method, comprising:
receiving, at a network device and from a first neighbor network device, information indicating that the network device is to remove a bit indexed explicit replication (BIER) header from a multicast packet prior to transmitting the multicast packet to the first neighbor network device,
wherein the network device is a BIER forwarding device, and
wherein the first neighbor network device does not support BIER;
receiving, at the network device and after receiving the information from the first neighbor network device, the multicast packet from a second neighbor network device,
wherein the multicast packet includes the BIER header and is to be transmitted to the first neighbor network device,
wherein the network device, the first neighbor network device, and the second neighbor network device are included in a same BIER domain, and
wherein the second neighbor network device is at least one of:
another BIER forwarding device, or
a BIER ingress device;
removing, by the network device, the BIER header from the multicast packet based on the information indicating that the network device is to remove the BIER header from the multicast packet prior to transmitting the multicast packet to the first neighbor network device; and
transmitting, by the network device, the multicast packet to the first neighbor network device, after removing the BIER header from the multicast packet, by using at least one of a multiprotocol label switching (MPLS) label associated with the first neighbor network device or an address associated with the first neighbor network device,
wherein the multicast packet includes the at least one of the MPLS label or the address.

16. The method of claim 15, wherein the information indicating that the network device is to remove the BIER header from the multicast packet prior to transmitting the multicast packet to the first neighbor network device is included in a value field of a sub-type-length-value (sub-TLV) field included in a signaling packet.

17. The method of claim 16, wherein the information indicating that the network device is to remove the BIER header from the multicast packet prior to transmitting the multicast packet to the first neighbor network device comprises:

a type field, associated with removing the BIER header from the multicast packet, of another sub-TLV field included in the value field of the sub-TLV field.

18. The method of claim 15, wherein the information indicating that the network device is to remove the BIER header from the multicast packet prior to transmitting the multicast packet to the first neighbor network device comprises:
a label indicating removal of the BIER header included in the multicast packet.

19. The method of claim 15, wherein the network device, the first neighbor network device, and the second neighbor network device are included in at least one of:
a multicast virtual private network (MVPN), or
an Ethernet virtual private network (EVPN).

20. The method of claim 15, wherein the multicast packet includes:
a BIER label for a MPLS-based BIER implementation, or
a bit index forwarding table (BIFT) identifier for a non-MPLS-based BIER implementation; and
wherein removing the BIER header from the multicast packet comprises:
removing the BIER label or the BIFT identifier from the multicast packet.

* * * * *